UNITED STATES PATENT OFFICE.

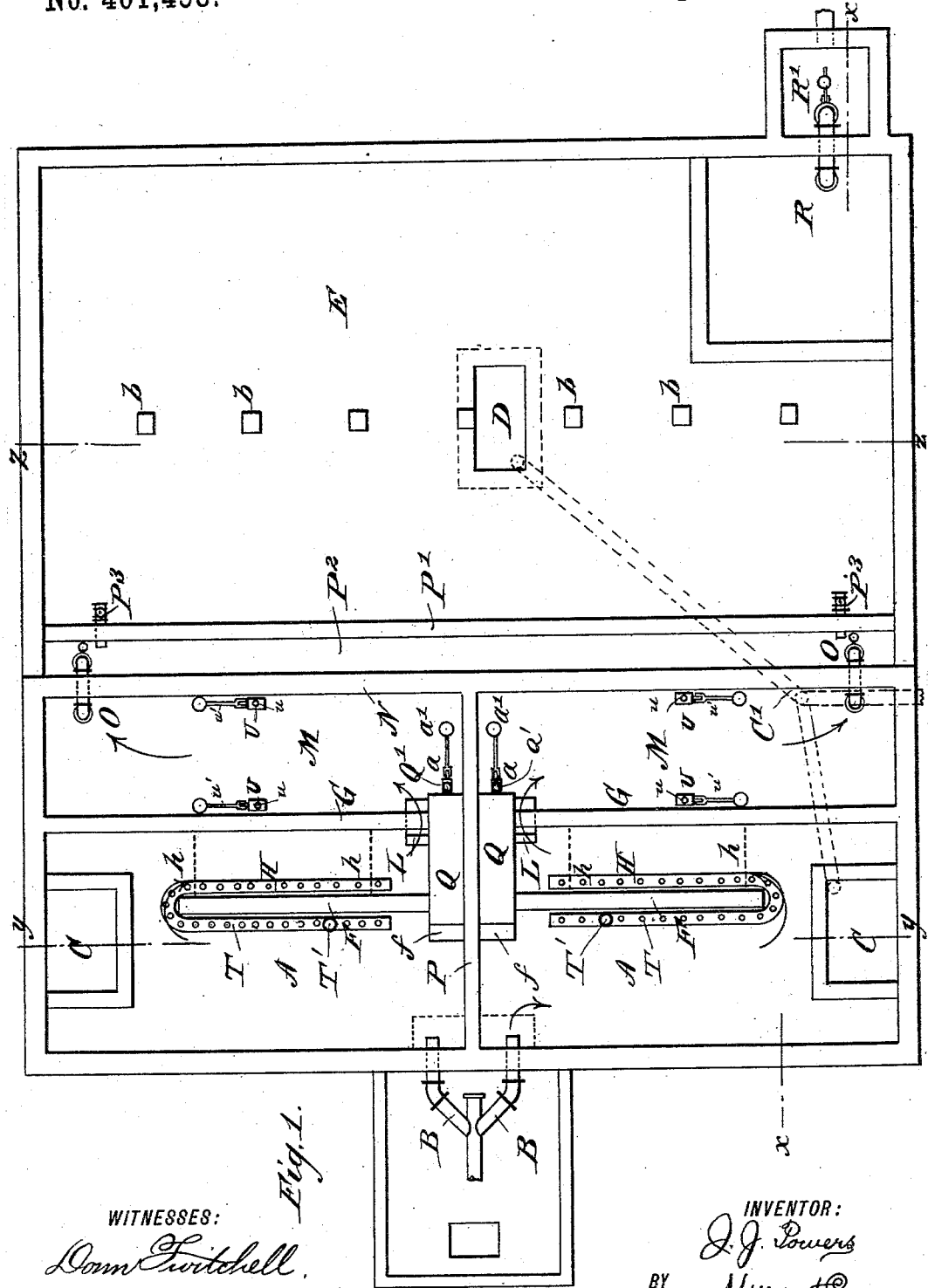

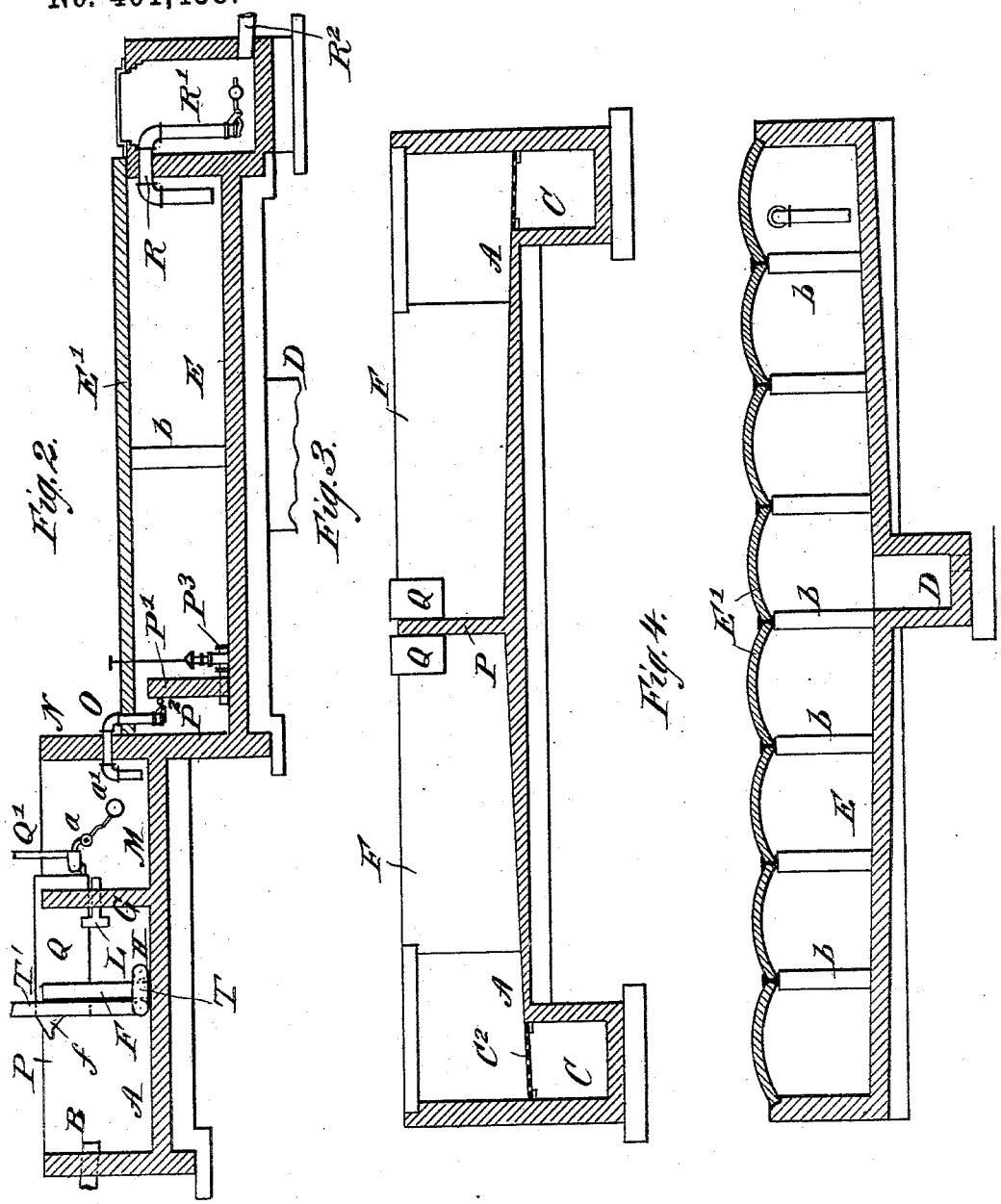

JAMES J. POWERS, OF NEW YORK, N. Y.

SEWAGE-PURIFIER.

SPECIFICATION forming part of Letters Patent No. 401,458, dated April 16, 1889.

Application filed October 26, 1888. Serial No. 289,170. (No model.)

*To all whom it may concern:*

Be it known that I, JAMES J. POWERS, of Brooklyn, in the county of Kings and State of New York, have invented a new and Improved Sewage-Purifier, of which the following is a full, clear, and exact description.

My invention relates to a sewage-purifier wherein the sewage is supplied with lime at intervals and precipitated, the effluent flowing off at the end of the apparatus, while the sludge and solid matter remains, to be removed at intervals.

By my invention I am enabled to retain the sewage in a quiescent state while settling, the flow being intermittent to and from the settling-tanks and automatically regulated at given quantities.

Reference is to be had to the accompanying drawings, forming a part of this specification, in which similar letters of reference indicate corresponding parts in all the figures.

Figure 1 is a plan view of the apparatus without the roof. Fig. 2 is a sectional elevation on the line $x\ x$ of Fig. 1. Fig. 3 is a transverse sectional elevation on line $y\ y$ of Fig. 1; and Fig. 4 is a sectional view on line $z\ z$ of Fig. 1, showing the roof.

The purifier is made of masonry mostly, with concrete bottom or flooring, and the settling-tank is in duplicate, so that when one is to be cleaned the sewage may be turned into the other. A A represent the said settling-tanks. The sewage is admitted to them through pipes B B. In each tank is a pit, C, into which the solid matters precipitated in the tank A may be forced, to be pumped through pipe C' to any place desired. In each tank A is built a short wall, F, which, with wall G, forms channels or screen-chambers H, across each of which is fitted one or more screens, $h$. The sewage flows from tanks A, around the end of the walls F, through channels H and pipes L, to the intermediate settling and disinfecting tanks, M. In the wall N, which constitutes one side of the tanks M, are fitted the siphons O, one for each tank M. On each side of the partition P, which separates the tanks A A and M M, is placed a receiver, Q, for lime, having a discharge-pipe, $f$. To the rear end of each of these receivers is attached a water-pipe, Q', attached to a water supply or head, in which pipe is fitted a cock, $a$, having a float, $a'$, so that when the fluid in the intermediate disinfecting or settling tanks M is discharged it will open said cocks and permit the water from the pipes Q' to flush the receivers Q, and thus automatically discharge lime-water into the sewage in tanks A. The floats $a'$ are arranged in such a manner relatively to the siphons O that the cocks will be opened just after the fluid begins to flow through the siphons. Of course when the fluid is siphoned off from tanks M to the final settling-tank E the cocks $a$ will be automatically closed and the flow of water to the lime-receivers Q cut off until the tanks M are again being discharged. In contact with each wall F is placed a perforated pipe, T, to which a pipe, T', is attached, so that through these pipes chlorine or other gas may be injected into the sewage in tank A.

The fluid-settling tank E is on a lower level than the tanks A M. It is covered by roof E', supported by posts $b\ b$. It is of much larger area than the tanks M, and to avoid currents therein I employ a bridge, P', forming a narrow channel, P², into which the siphons O first empty the sewage. From this channel the sewage passes to the final settling-tank E over the top of bridge P'. The effluent in tank E is automatically drawn by the siphon R over the wall of space R', from which it finds its escape through the outlet-pipe R². (Shown clearly in Fig. 2.) The cocks P³ are for emptying the channel P² when desired.

U U are small receptacles for chemicals, to be supplied at intervals to the sewage. Each receptacle is provided with a pipe, $u$, connected to a head or supply of water and provided with an automatic float-valve, $u'$, to be opened and closed by the rise and fall of sewage in tanks M.

In operation the sewage reaches the tank A through the pipes B and flows around through chamber H, the solids settling on account of the decreased velocity and the admixture of lime solution. The fluid overflows through the pipe L into the tank M, where it operates the automatic injector-valves $u'$, thus charging itself with the necessary chemical. When the tank M is full and charged, the siphon O discharges the contents into tank E, which, being from five to twenty times larger than M, allows the time-storage necessary for complete precipitation. The alternate levels of liquid in tank M, due to the filling and emptying of same, also operates the valves $a$, which displace the slaked lime in tanks Q and cause it to flow into tank A through the pipe $f$, and also the valves for discharging chemicals into the tank M. When the quantity of fluid in tank M reaches the top of siphon O, it is automatically discharged into the outfall E, the storage size of this tank being proportioned for the length of time required for precipitation.

When the solids in one tank A have accumulated so as to require removal, the flow of sewage is changed into the duplicate tank, and when the effluent is drawn off the sludge is allowed to pass through the screen $C^2$ into the sludge-pit C, from which it is pumped through pipe C'. The light sediment in D is also removed by pumping.

Having thus fully described my invention, I claim as new and desire to secure by Letters Patent—

1. The tanks A and M and connecting-passage L, in combination with the lime-receiver Q, pipe Q', connecting said receiver with a water supply or head, a float-valve fitted in said supply-pipe within the tank M, and a siphon for intermittently emptying the tank M, the float-valve being adapted to be opened and closed at intervals by the rise and fall of sewage in tank M, whereby a given quantity of lime may be automatically supplied at intervals to a given quantity of sewage, substantially as described.

2. The tank M, chemical-receptacles U, located within said tank, and pipes $u$, connecting the receptacles U with a water supply or head, in combination with a siphon, O, for intermittently emptying the tank M, and float-valves $u'$, fitted in the pipes $u$ within the tank M, substantially as and for the purposes set forth.

3. A sewage-purifier constructed to form a primary tank and settling or disinfecting tank M, in combination with perforated tubes H and pipes T', lime-injector Q, water-supply pipe Q', closed by a float-valve, and chemical-injectors located in the tank M and provided with float-valves, substantially as described.

JAMES J. POWERS.

Witnesses:
H. A. WEST,
EDGAR TATE.